United States Patent [19]

Le Fol et al.

[11] Patent Number: 5,209,462
[45] Date of Patent: May 11, 1993

[54] HYDROELASTIC SUPPORT

[75] Inventors: Marcel Le Fol, Domloup; Pascal Robic, Rennes, both of France

[73] Assignees: Automobiles Peugeot, Paris; Automobiles Citroen, Neuilly Sur Seine, both of France

[21] Appl. No.: 798,659

[22] Filed: Nov. 26, 1991

[30] Foreign Application Priority Data

Dec. 10, 1990 [FR] France .................. 90 15439

[51] Int. Cl.$^5$ .......................................... B60G 13/00
[52] U.S. Cl. .................... 267/219; 267/140.14
[58] Field of Search ............... 188/140.1 A, 140.1 E, 188/140.1 AE, 35, 219, 220; 248/562, 530

[56] References Cited

U.S. PATENT DOCUMENTS 4,756,513  7/1988  Carlson et al. ............ 267/140.1 A
4,889,326 12/1989  Bouhours ................. 267/140.1 AE

FOREIGN PATENT DOCUMENTS 0115417   8/1984  European Pat. Off. .
0163162  12/1985  European Pat. Off. .
0163817  12/1985  European Pat. Off. .
0163949  12/1985  European Pat. Off. .
0297974   1/1989  European Pat. Off. .
0347666  12/1989  European Pat. Off. .
0358538   3/1990  European Pat. Off. .
2737985   3/1978  Fed. Rep. of Germany .
3801108   7/1989  Fed. Rep. of Germany .
2642493   8/1990  France .
59-103044  6/1984  Japan .
59-144839  8/1984  Japan .
61-119832  6/1986  Japan .
62-137437  6/1987  Japan .
63-62929   3/1988  Japan .
1-40733    2/1989  Japan .
1-158241   6/1989  Japan .
2164416    3/1986  United Kingdom .

OTHER PUBLICATIONS

Arnold R. Thompson, "Shock Mounting For Heavy Machines," NTIS Tech. Notes, No. 12, Dec. 1984, p. 1022, Springfield, Va. (USA).

Primary Examiner—George E. A. Halvosa
Assistant Examiner—Lee W. Young
Attorney, Agent, or Firm—Burns, Doane, Swecker & Mathis

[57] ABSTRACT

The invention proposes a hydroelastic support intended to be interposed between two assemblies to be suspended by one with regard to the other, especially for the suspension of an engine in a motor vehicle, of the type comprising two armatures connected respectively to the two assemblies, these two armatures being joined by a block of elastomer material, the support comprising at least one working chamber delimited at least in part by the block of elastomer material, and an expansion chamber, these two chambers being filled at least partially with liquid and linked together by a communication passage, and of the type in which the working chamber is also delimited in part by a movable diaphragm in elastic material and whose external face comprises a cam follower with which a cam of a drive device of the movable diaphragm cooperates in order to apply to the latter displacements controlled in such a way as to create in the working chamber pressure forces synchronous with the harmonics of the vibrations of one of the said two assemblies, characterized in that the rotational drive shaft of the cam is mounted rotatably in a bearing fixed to one of the two armatures.

6 Claims, 3 Drawing Sheets

HYDROELASTIC SUPPORT

The present invention relates to a hydroelastic intended to be interposed between two assemblies to be suspended one with regard to the other.

The invention relates especially to a support for the suspension of an engine in a motor vehicle.

Document FR-A-2,364,373 describes and illustrates a hydroelastic support of the type comprising two armatures connected respectively to the two assemblies to be suspended, these two armatures being joined by a block of elastomer material, the support comprising at least one working chamber and one expansion chamber, these two chambers being filled at least partially with liquid and linked together by a communication passage, and of the type in which the working chamber is delimited in part by a movable diaphragm in elastic material whose external face comprises a cam follower with which a cam of a drive device of the movable diaphragm cooperates in order to apply to the latter displacements controlled in such a way as to create in the working chamber pressure forces synchronous with the harmonics of the vibrations of one of the two assemblies to be isolated such as, for example, a rotating machine or an internal combustion engine. The displacements to which the cam follower is subjected are, for example, alternating displacements with a frequency and a phase which are equal to those of the imbalance to be filtered.

The arrangement described and illustrated in this document is of particularly complex design, this document not, moreover, proposing any industrially practicable solution permitting the mounting in a simple manner of such a type of hydroelastic support between the body of a motor vehicle and the power plant while ensuring the rotational drive to the excitation cam for the movable diaphragm.

In order to overcome these limitations, the invention proposes a support of the type mentioned above, characterised in that the rotational drive shaft for the cam is mounted rotatably in a bearing fixed to one of the two armatures of the support.

According to other characteristics of the invention:
 this armature is an armature of generally cylindrical form of which a first axial extremity is connected to the block of elastomer material and of which a second axial extremity receives a closing cover in which the bearing is housed;
 the second axial extremity of the cylindrical armature comprises a flange for fixing the support to the assembly and the cover comprises a radial flange arranged to line up with the flange on the armature against which it is clamped axially, interposing the corresponding portion of the assembly which receives the hydroelastic support; and
 the cam follower comprises a wheel mounted rotatably on an axis perpendicular to the direction of action of the cam follower on the movable diaphragm and with which the cam whose axis of rotation is parallel to that of the wheel cooperates.

Other characteristics and advantages of the invention will become clear on reading the detailed description which follows for an understanding of which reference will be made to the attached drawings in which.

Figure 1:
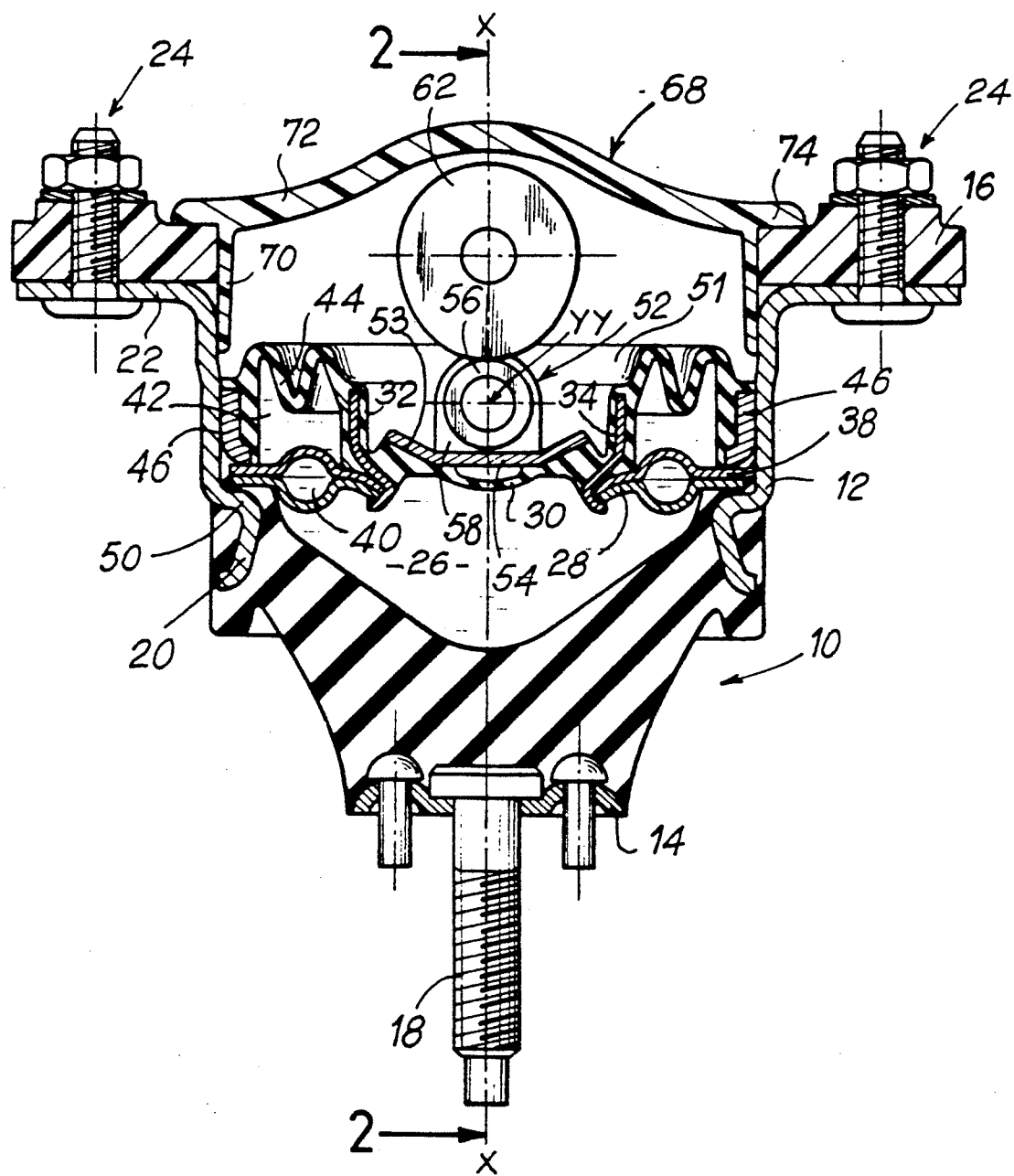
FIG. 1 is a view in axial section along the line 1—1 of FIG. 2 of a hydroelastic support made in accordance with the teachings of the invention.

The support 10 illustrated in the figures consists of a first armature of generally cylindrical form 12 and a second armature 14 which are connected together by a block of elastomer material 15.

The armature 12 is provided in order to be connected to a part 16 of the power plant of a motor vehicle while the second armature 14 is provided in order to be connected to a part of the structure of the vehicle by means of a threaded link 18.

The first armature 12 has a generally cylindrical form with an axis X—X.

The first axial extremity 20 of the armature 12 is set into the elastomer material of the block 15.

The opposite second axial extremity 22 of the armature 12 is a flange which extends in a radial plane and which permits the fixing of the armature 12 to the portion 16 of the power plant by means for example of a nut and bolt assembly 24.

The block of elastomer material 15 partly delimits a working chamber 26 at its lower part when looking at the figures.

The chamber 26 is also delimited by an intermediate rigid plate 28 of generally annular form and by an elastically deformable movable diaphragm 30 which is capable of being displaced substantially along the direction X—X.

The movable diaphragm 30 is extended at its periphery by a connecting portion 32 which is bonded to a cylindrical reinforcement 34 whose lower axial edge 36 is set in the central circular opening of the plate 28.

The plate 28 cooperates with a symmetrical plate 38 to define between them a passageway 40 which, according to a known technique, connects the working chamber 26 with an expansion chamber 42.

The chambers 26 and 42 are filled with liquid.

The expansion chamber 42 is delimited on the one hand by the upper face of the annular plate 38 and on the other hand by a portion of elastically deformable membrane 44 integral with the movable diaphragm 30 and the linking portion 32, and is itself bonded to an external cylindrical reinforcement 46.

The reinforcement 46 is fitted axially and clamped into the cylindrical armature 12 and secures the plates 28 and 38 in position with axial pressure against the internal radial shoulder 50 of the cylindrical armature 12 partially set into the elastomer material of the block 15.

The upper face 53 of the movable diaphragm 30 sited outside the working chamber 26 comprises an actuating cam follower 52 which allows forces in the direction X—X to be applied to it.

The cam follower 52 comprises a plate 54 which extends along a plane virtually perpendicular to the axis X—X and which is bonded to the upper face 53 of the movable diaphragm 30.

The cam follower 52 comprises an actuating wheel 56 which is mounted rotatably on the cam follower 52 around a geometric axis Y—Y substantially perpendicular to the axis X—X of the support, this being by virtue of a clevis mounting formed by two plates 58 between which is received the wheel 56 which is mounted rotatably on an axle 60.

The chamber 42 is of generally annular or toroidal form and extends around the cylindrical reinforcement 34. The chamber 42 thus delimits an interior housing 51 of cylindrical form in which is arranged the cam follower 52 and its wheel 56. The height of the cam follower and its wheel is less than that of the housing 51, which permits the construction of a particularly compact assembly and an overall reduction in height.

The actuation of the cam follower 52 by means of the wheel 56 is effected with the aid of a cam 62 which is itself mounted rotatably and driven in rotation around a geometrical axis Z—Z parallel to the axis Y—Y of the wheel 56 and thus perpendicular to the axis X—X of the support.

The cam 62 comprises a rotary drive shaft 64 which is mounted rotatably with the aid of two ball bearings 66 arranged on either side of the cam and which constitute its rotary bearing.

The bearings 66 are mounted in an element 68 forming a cover which is located in the cylindrical armature 12 in which it is centred by means of a cylindrical centring portion 70 and which is closed at its upper part by a disc 72.

The disc 72 ends radially in an extension 74 in the form of a flange which extends substantially face to face with the flange 22 of armature 12.

The portion 16 of the power plant is interposed between the flanges 22 and 74.

The cover 68 is secured axially in position by means of fixing screws 76 at an angle offset with regard to the nut and bolt assemblies 24.

The cover 68 is, for example, a moulded plastic part which comprises a central recess 80 formed in the lower face of the disc 72 and in which the cam 62 is arranged.

The recess 80 is delimited transversely on the one hand by a vertical diaphragm 82 which receives one of the bearings 66 and on the other hand by the extremity 84 of a tubular extension 86 of the cover 68 into which extends the free drive extremity 88 of the drive shaft 64 of the cam 62.

Figure 2:
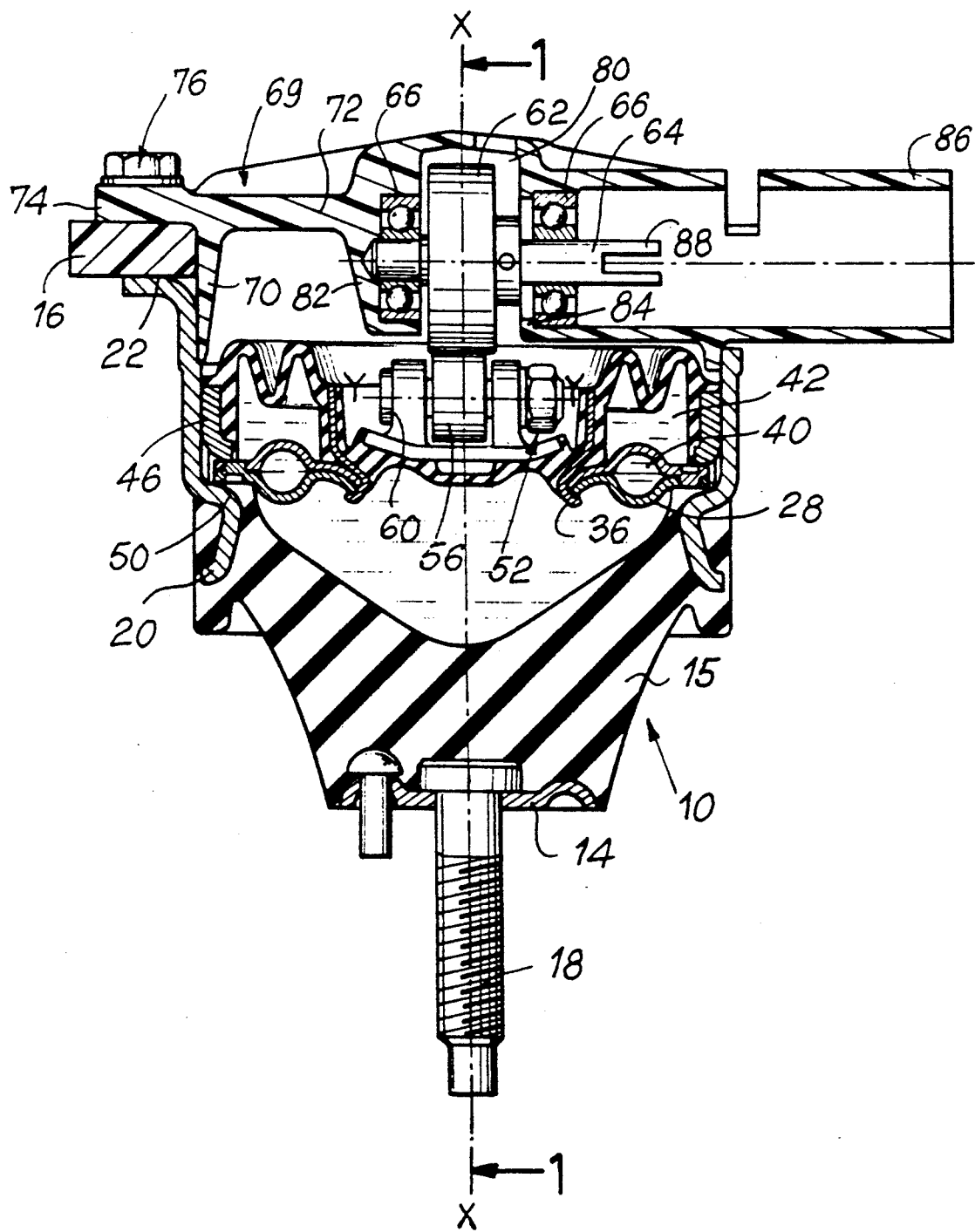
FIG. 2 is an axial view in section along the line 2—2 of FIG. 1.
Figure 3:
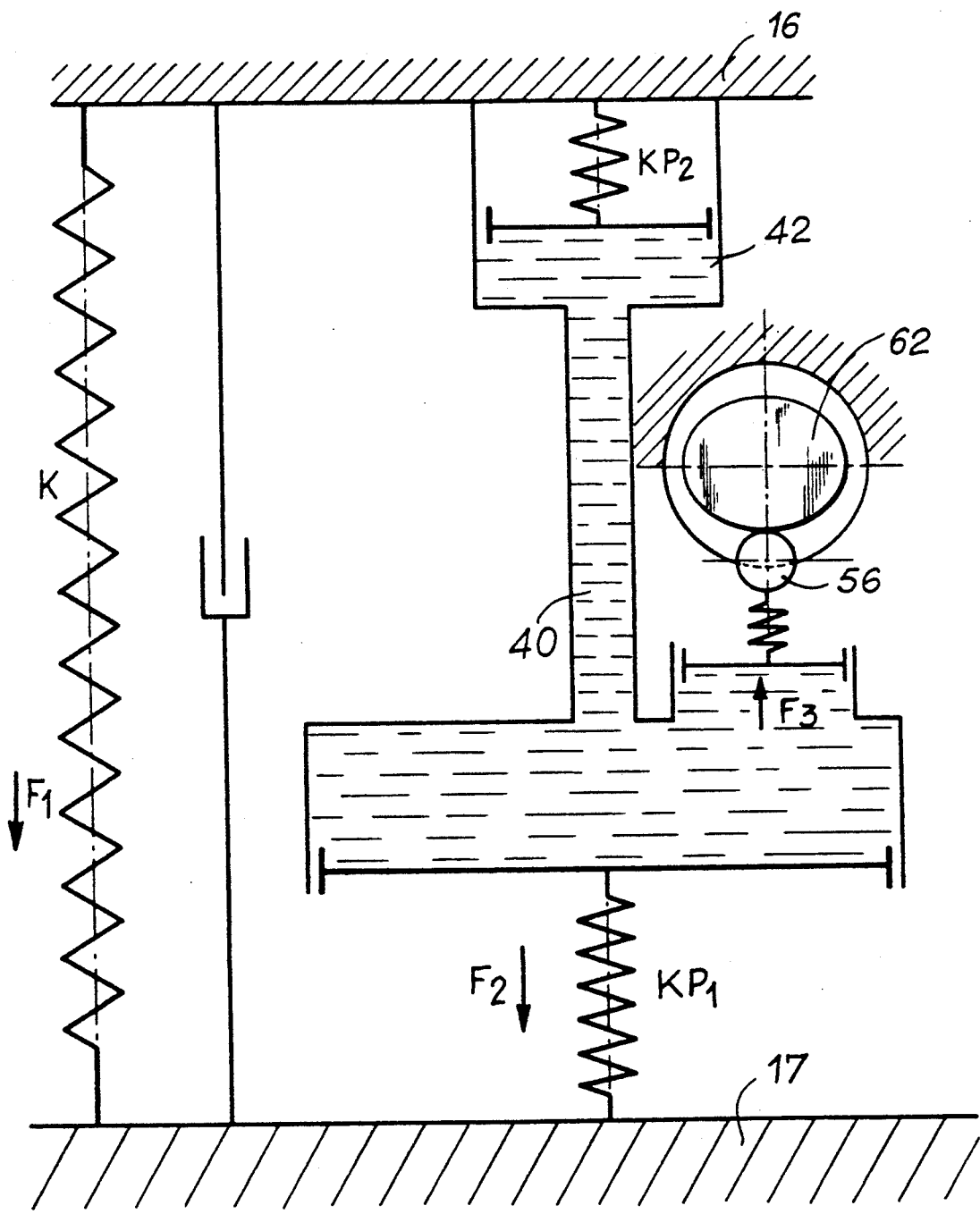
FIG. 3 is an equivalent diagrammatic representation permitting an explanation of the mode of operation of the support represented at FIGS. 1 and 2.

The mode of operation of the hydroelastic support represented in FIGS. 1 and 2 will now be described with reference to FIG. 3.

The vibrations of the power plant 16 are transmitted to the body of the vehicle by means of the armature 12, the block of elastomer material 15 and the armature 14.

The force applied to the support can be broken down into two distinct forces.

Firstly, the force F1, also known as direct force, whose value depends on the stiffness K of the block of elastomer material 15.

Secondly, the force F2, which results from the action of the liquid contained in the working chamber 26 and whose value depends on the stiffness of the pressurisation KP1.

The cam 62 which is driven in rotation in a synchronous manner with regard to the rotation of the power plant, and especially with regard to the rotation of the crankshaft of the latter, transmits a perfectly synchronous force F3 whose magnitude is such that F3=F1+F2. The action of the cam 62 thus has the effect of cancelling out all forces transmitted to the structure 17.

The block of elastomer 15 behaves likes a pump and it is mounted compressed during the installation of the hydroelastic support.

The device which has just been described is particularly efficacious for damping or attenuating vehicle-body vibrations, as well as for preventing the transmission of vibrations coming from the engine so as to produce a more comfortable vehicle. The well-known use of the passage 40 which interconnects the working chamber 26 and the expansion chamber 42 produces improved damping at the cancelling frequency.

The action of the cam 62 permits the application to the hydroelastic support of pressure forces from outside. These pressure forces are synchronous with the second order harmonics of the excitation vibrations coming from the power plant.

The pressure forces are thus injected into the working chamber of a hydroelastic support of the column-damping type in successive waves.

As was mentioned above when referring to the diagram of FIG. 3, the resulting stiffness is nil.

The cam 62, in order to be driven round in synchronism with the power plant, is, for example, connected by its shaft 88 to a pulley directly driven by the power-plant timing belt, or by any other mechanism permitting the cam to be driven.

We claim:

1. Hydroelastic support intended to be interposed between two assemblies to be suspended with respect to one another, for example the suspension of an engine in a motor vehicle, comprising two armatures connected respectively to the two assemblies, these two armatures being joined by a block of elastomer material, the support comprising at least one working chamber delimited at least in part by the block of elastomer material, and an expansion chamber, these two chambers being filled at least partially with liquid and linked together by a communication passage, the working chamber being delimited in part by a movable diaphragm of elastic material having an external face comprising a cam follower with which a cam of a drive device for the movable diaphragm cooperates in order to apply to the latter displacements controlled in such a way as to create in the working chamber pressure forces synchronous with the harmonics of the vibrations of one of the said two assemblies, wherein a rotational drive shaft of the cam is mounted rotatably in a bearing fixed to one of the two armatures
    wherein said one armature has a generally cylindrical form with a first axial extremity connected to the block of elastomer material and with a second axial extremity receiving a closing cover in which is arranged the bearing of the drive shaft of the cam.

2. Hydroelastic support according to claim 1, wherein the expansion chamber is of generally annular form and delimits an interior housing in which is arranged the cam follower.

3. Hydroelastic support intended to be interposed between two assemblies to be suspended with respect to one another, for example the suspension of an engine in a motor vehicle, comprising two armature connected respectively to the two assemblies, these two armature being joined by a block of elastomer material, the support comprising at least one working chamber delimited at least in part by the block of elastomer material, and an expansion chamber, these two chambers being filled at least partially with liquid and linked together by a communication passage, the working chamber being delimited in part by a movable diaphragm of elastic material having an external face comprising a cam follower with which a cam of a drive device for the movable diaphragm cooperates in order to apply to the latter displacements controlled in such a way as to create in the working chamber pressure forces synchronous with the harmonics of the vibrations of one of the said two assemblies, wherein a rotational drive shaft of the cam is mounted rotatably in a bearing fixed to one of the two armatures;

wherein said one armature has a generally cylindrical form with a first axial extremity connected to the block of elastomer material and with a second axial extremity receiving a closing cover in which is arranged the bearing of the drive shaft of the cam; and wherein the second axial extremity of the cylindrical armature includes a flange for fixing the support to the corresponding assembly, and wherein the cover includes a radial flange arranged to line up with the flange on the armature against which it is clamped axially, interposing the corresponding portion of the said assembly which receives the hydroelastic support.

4. Hydroelastic support according to claim 3, wherein the expansion chamber is of generally annular form and delimits an interior housing in which is arranged the cam follower.

5. Hydroelastic support intended to be interposed between two assemblies to be suspended with respect to one another, for example the suspension of an engine in a motor vehicle, comprising two armatures connected respectively to the two assemblies, these two armature being joined by a block of elastomer material, the support comprising at least one working chamber delimited at least in part by the block of elastomer material, and an expansion chamber, these two chambers being filled at least partially with liquid and linked together by a communication passage, the working chamber being delimited in part by a movable diaphragm of elastic material having an external face comprising a cam follower with which a cam of a drive device for the movable diaphragm cooperates in order to apply to the latter displacements controlled in such a way as to create in the working chamber pressure forces synchronous with the harmonics of the vibrations of one of the said two assemblies, wherein a rotational drive shaft of the cam is mounted rotatably in a bearing fixed to one of the two armatures; and wherein the cam follower comprises a wheel mounted rotatably on an axis perpendicular to the direction of action of the cam follower on the movable diaphragm and with which the cam whose axis of rotation is parallel to that of the wheel cooperates.

6. Hydroelastic support according to claim 5, wherein the expansion chamber is of generally annular form and delimits an interior housing in which is arranged the cam follower.

* * * * *